United States Patent [19]

Sase et al.

[11] Patent Number: 5,260,794
[45] Date of Patent: Nov. 9, 1993

[54] VIDEO SIGNAL PROCESSING APPARATUS FOR USE WITH A VIDEO CAMERA

[75] Inventors: Masatoshi Sase; Makoto Onga, both of Kanagawa, Japan

[73] Assignee: Sony Corporation, Tokyo, Japan

[21] Appl. No.: 895,557

[22] Filed: Jun. 8, 1992

Related U.S. Application Data

[63] Continuation of Ser. No. 597,308, Oct. 15, 1990.

[30] Foreign Application Priority Data

Oct. 18, 1989 [JP] Japan .................................. 1-270771
Oct. 18, 1989 [JP] Japan .................................. 1-270773

[51] Int. Cl.$^5$ ................................................ H04N 5/18
[52] U.S. Cl. ................................. 358/172; 358/213.15; 358/171; 358/41
[58] Field of Search ............ 358/172, 171, 173, 213.26, 358/213.27, 213.28, 213.15, 213.31, 213.19, 213.16, 176, 177, 178, 180

[56] References Cited

U.S. PATENT DOCUMENTS

| | | | |
|---|---|---|---|
| 4,437,112 | 3/1984 | Tanaka et al. | |
| 4,551,761 | 11/1985 | Sase et al. | 358/213.15 |
| 4,553,169 | 11/1985 | Yoshioka et al. | 358/231.31 |
| 4,652,927 | 3/1987 | Hashimoto | 358/213.31 |
| 4,682,211 | 7/1987 | Kaji | 358/41 |
| 4,742,392 | 5/1988 | Hashimoto | 358/172 |
| 4,816,917 | 3/1989 | Yamamoto et al. | 358/172 |

FOREIGN PATENT DOCUMENTS 0291354 11/1988 European Pat. Off.
0339718 2/1989 European Pat. Off.

OTHER PUBLICATIONS

Patent Abstracts of Japan, vol. 11, No. 17 (E-471) [2464], 17th Jan. 1987; and JP-A-61 187 468 (Nec Corp.) Aug. 21, 1986.
Patent Abstracts of Japan, vol. 9, No. 225 (E-342) [1948], 11th Sep. 1985; and JP-A-60 083 472 (Matsushita Denki Sangyo K.K.) May 11, 1985.
Patent Abstracts of Japan, vol. 12, No. 250 (E-633), 14th Jul. 1988; and JP-A-63 038 384 (Sony Corp.) Feb. 18, 1988.

*Primary Examiner*—Victor R. Kostak
*Assistant Examiner*—Michael H. Lee
*Attorney, Agent, or Firm*—William S. Frommer; Alvin Sinderbrand

[57] ABSTRACT

Video signal processing apparatus for use with a video camera having a line scanning line period during which useful video information is provided and a flyback period during which an optical black signal level is provided. Replacement black signal information that is a function of the optical black signal level is inserted into a portion of the flyback period. When the camera is of the type having a complementary color matrix filter which produces odd and even raster scan lines of image pickup signals with different modulation components, another aspect of this invention provides improved contour correction. Modulation components in a scan line of image pickup signals caused by the patterns of filter elements included in the matrix are removed, thereby producing an averaged scan line of image signals from which is extracted a signal component that is uncorrelated from one line to the next. Prior to such extraction, that portion of an averaged scan line of image signals which exceeds a predetermined level that is less than the lowest average level of a scan line of image signals which would saturate video processing circuitry is clipped. The extracted, uncorrelated signal component is combined with an averaged scan line of image signals to produce a contour-emphasized luminance signal.

12 Claims, 11 Drawing Sheets

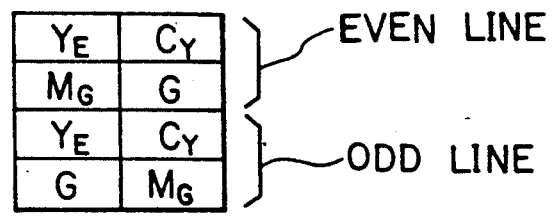
FIG. 4
RELATED ART
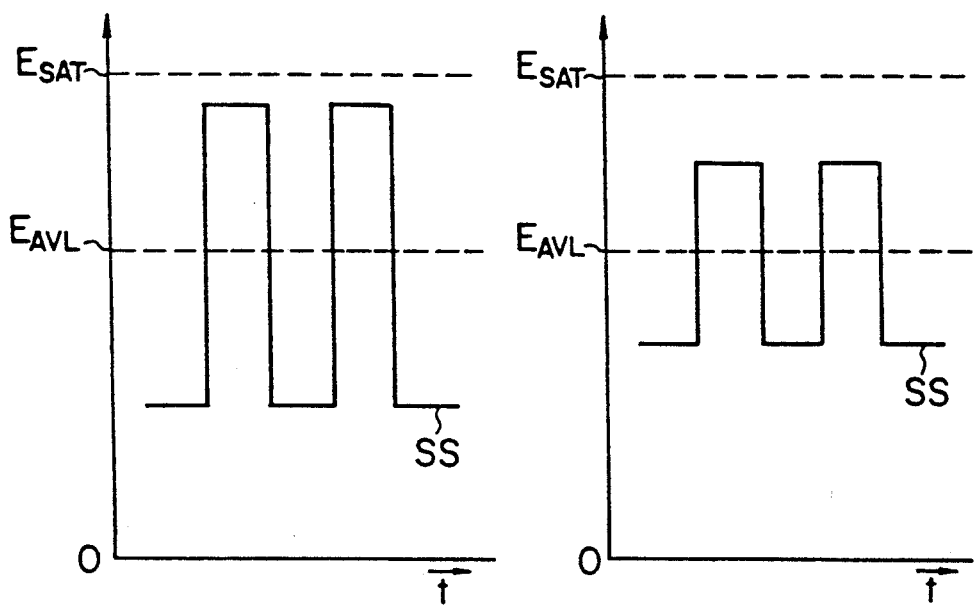
FIG. 5
RELATED ART
FIG. 6
RELATED ART

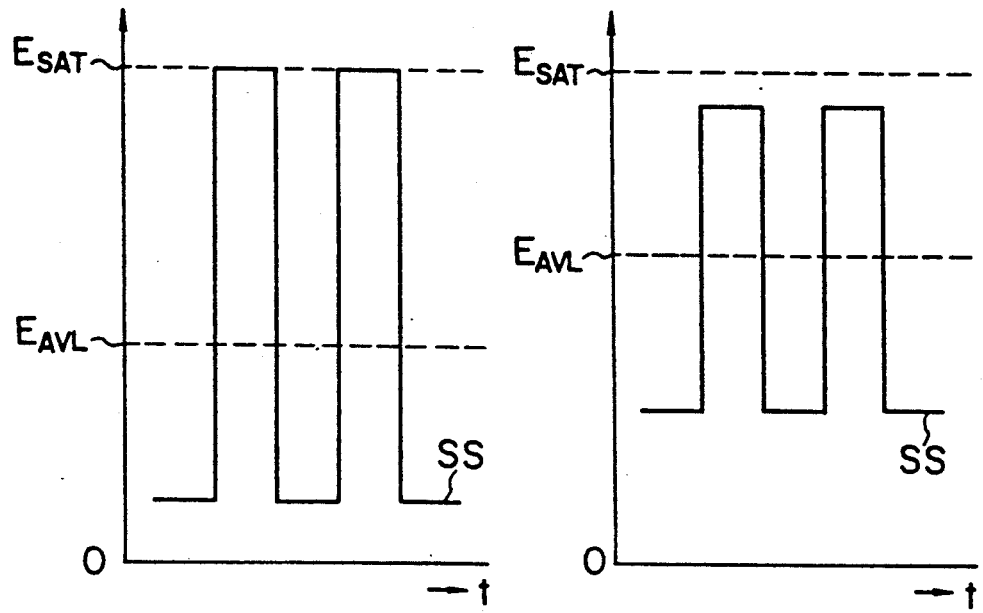
FIG. 7
RELATED ART
FIG. 8
RELATED ART
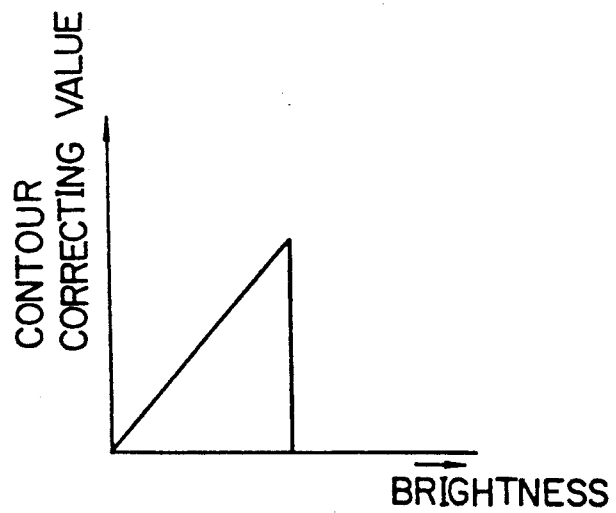
FIG. 9
RELATED ART

VIDEO SIGNAL PROCESSING APPARATUS FOR USE WITH A VIDEO CAMERA

This application is a continuation of application Ser. No. 07/597,308, filed Oct. 15, 1990.

BACKGROUND OF THE INVENTION

1. Field of the Invention

This invention relates to video signal processing apparatus for use with a video camera and, more particularly, to such apparatus which, in one embodiment, inserts into the video signal derived from that camera a black signal information component to which other video processing circuits may be clamped; and which, in another embodiment, produces an improved contour-emphasized luminance signal.

2. Discussion of the Prior Art

In video image pickup apparatus, such as television cameras (for example, television cameras having charge coupled device pickup members), still video cameras and video signal processing circuits used with such cameras, several stages of processing circuitry carry out operations which are dependent upon a reference video signal level, such as that which represents black information. The accuracy with which such signal processing operations are performed is dependent upon a reference black level which best represents the optical black level that may be derived from the image pickup device of the camera, even if the scene being imaged does not then contain black information. A typical video camera, whether of the CCD-type or otherwise, scans information imaged onto a pickup element in a line-by-line raster array formed of a line scanning period, during which useful video information is scanned, followed by a flyback period, during which the video camera is conditioned to scan the next line of image information. Usually, information representing a desired black reference signal level is inserted into the video signal during the flyback period. Luminance and chrominance components which are derived from the image information produced by the pickup element are formed relative to this reference black signal level.

One example of a CCD imaging arrangement in which a black reference signal level is inserted into the horizontal flyback period of the video signal produced by a television camera is illustrated in FIG. 1. Here, the image pickup element is represented as a CCD device 2 having a useful image pickup area 2A and light-shielded optical black surface 2B adjacent the image pickup surface. As is conventional, electrical signals produced as stored charges across CCD device 2, including the signals produced across image pickup surface 2A and optical black surface 2B, are shifted on a line-by-line basis into a horizontal storage register 2C from which the contents are read out in serial fashion. The resultant photoelectric output $S_1$ from horizontal register 2C is amplified and supplied to an output terminal $P_1$ as an image pickup signal $S_2$.

A schematic representation of the image pickup signal $S_2$ is illustrated as the waveform shown in FIG. 3A. This image pickup signal is comprised of useful video information $W_1$ produced during a line scanning period $T_1$, followed by the flyback period formed of portions $T_2$, $T_4$ and $T_3$. The sum of these periods $T_1$–$T_4$ is equal to a horizontal scanning interval, known as a "1 H" interval. During portion $T_2$ of the horizontal flyback period, the signal $W_2$ derived from the scanned optical black surface 2B of FIG. 1 is generated. The level of this signal $W_2$ is the black reference signal level produced by CCD device 2 and is equal to the video information produced when a truly black image is scanned.

When image pickup device 1 of FIG. 1 is used with other signal processing circuitry of the type normally included in a video camera, the image pickup signal $S_2$ produced by the image pickup element is supplied to a processing circuit, such as circuit 4 shown in FIG. 2. The image pickup signal $S_2$ is sampled by a correlated double sampling circuit 5 (known as a CDS circuit), as schematically represented in FIG. 3A. The sampled signal is subjected to automatic gain control by an AGC circuit 6 to produce an image signal $S_3$ having the waveform shown in FIG. 3B. Here, the image signal $S_3$ is comprised of useful video information $W_{11}$ during line scanning period $T_1$, and the black reference signal level $W_{12}$ derived from optical black surface 2B during portion $T_2$ of the horizontal flyback period. The black reference signal level $W_{12}$ is referred to as the optical black signal level. The image signal also includes a blank signal $W_{14}$ during portion $T_4$ of the flyback period, as well as a blank signal $W_{13}$ during that portion $T_3$ of the flyback period which immediately precedes scanning period $T_1$.

The image signal $S_3$ shown in FIG. 3B is applied to a clamp circuit 7. This clamp circuit is provided with a clamp pulse $CLP_1$, shown in FIG. 3C, during portion $T_2$ of the flyback period to clamp the signal level of the image signal during portion $T_2$ to the optical black signal level $W_{12}$ which then is present in the image signal $S_3$. Clamp circuit 7 supplies to a signal processing section 8 the clamped image signal $S_4$ (whose waveform is similar to that of signal $S_3$ in FIG. 3B) with the optical black signal level $W_{12}$ properly clamped to the level derived from the scanning of optical black surface 2B of CCD pickup 2. The signal processing section utilizes the clamped optical black signal level $W_{12}$ as a reference from which various video processing operations are carried out. The resultant processed video signal $S_5$ is supplied to an output terminal $P_2$ by signal processing section 8.

Typical processing operations that may be carried out by signal processing section 8 include gamma correction, luminance signal derivation, chrominance signal carrier balance, 1 H delay circuit gain adjustment, aperture control and horizontal synchronizing signal generation. These operations typically rely upon a fixed, unvarying reference signal level that is related to the image signal produced by image pickup device 2. By using the optical black signal level $W_{12}$ derived from optical black surface 2B, a proper reference signal level is obtained. However, signal processing section 8 normally is formed of a number of individual operating stages, each adapted to carry out a respective signal processing operation. In doing so, each stage establishes its own reference signal level in order to execute its designated operation; and this is done by clamping the optical black signal level $W_{12}$ which had already been clamped by clamp circuit 7.

As each stage carries out its own individual clamping operation, inconsistencies and/or errors may be introduced into the signal level which ultimately is clamped. That is, although the optical black signal level $W_{12}$ present in clamped image signal $S_4$ may be accurate, subsequent clamping operations carried out on this optical black signal level may be accompanied by noise, which results in an inaccurate noise-induced clamped reference signal level for a particular stage. In another stage, the clamped reference signal level may include a leakage voltage from the clamping pulse itself, which deforms the reference signal level in that stage. Consequently, the reference level which should be uniform in all stages may vary from one stage to another because of inaccuracies introduced by the individual clamping operations that are carried out by each such stage. The likelihood of such deviations in the reference level increases as the number of signal processing stages and, thus, the number of individual clamping operations, increases. Hence, errors may develop because signal operations which are carried out with the expectation that they all are referenced to the same reference level are, in fact, performed on the basis of different reference levels. Clearly, this is a drawback and disadvantage attending known video cameras and the video signal processing circuits used with those cameras.

Some color video cameras include an optical complementary color matrix filter through which the optical image of a scene is projected to the image pickup element. A small portion of such a complementary color matrix filter is schematically illustrated in FIG. 4 as including successive rows of alternating color filter elements. For example, one row is comprised of alternating yellow and cyan filter elements $Y_E$, $C_Y$, $Y_E$, $C_Y$, ..., etc., and the next row is formed of alternating magenta and green filter elements $M_G$, G, $M_G$, G, ..., etc. Thus, the complementary color matrix filter is comprised of one row formed of alternating $Y_E$ and $C_Y$ elements followed by the next row formed of alternating $M_G$ and G elements, and so on. Typically, the photoelectric signals which are produced by the image pickup element in response to a visual scene being imaged through the matrix filter are scanned such that those signals produced in response to the imaging through two adjacent rows of filter elements are scanned simultaneously. Thus, when a CCD image pickup element is used, the charges stored as a result of imaging through two vertically adjacent rows are scanned simultaneously when one horizontal raster line of image signals is produced.

Often, the patterns of the adjacent rows of filter elements from which an even scan line of image signals is produced differ from the patterns of the adjacent rows of filter elements from which an odd scan line of image signals is produced. This difference generally is equal to one row of filter elements. Accordingly, and with reference to FIG. 4, when an even horizontal line is scanned, that is, when an even scan line of image pickup signals is produced, that scan line may be derived from color filter elements $Y_E+M_G$, $C_Y+G$, $Y_E+M_G$, $C_Y+G$, etc. However, when an odd line is scanned, the image pickup signals produced by that odd scan line may be derived from the color filter elements $Y_E+G$, $C_Y+M_G$, $Y_E+G$, $C_Y+M_G$, etc.

It is appreciated that red and blue color signals may be formed of predetermined arithmetic combinations of yellow, cyan and magenta signals. For example, the red color signal may be formed by subtracting a cyan signal from the sum of yellow and magenta signals. As another example, the blue color signal may be formed by subtracting a yellow signal from the sum of magenta and cyan signals. Furthermore, the luminance signal Y is a function of the average value of the image pickup signal derived from all of the filter elements of the complementary color matrix filter. Thus, by arithmetic combination of the yellow, cyan and magenta signals, red and blue color difference signals R-Y and B-Y, as well as the luminance signal Y may be obtained.

However, it is known that, for a given brightness of a visual scene, the signal level derived from a yellow filter element $Y_E$ is greater than the signal level derived from a magenta filter element $M_G$ which, in turn, is greater than the signal level derived from a cyan filter element $C_Y$, which is greater than the signal level derived from a green filter element G. Because of this difference in the signal levels, the modulation component produced by the filter elements when an even line is scanned differs from the modulation component that is produced when an odd line is scanned. This difference in the modulation levels is represented by the waveforms shown in FIGS. 5 and 6.

FIG. 5 represents the image pickup signal produced when an even line is scanned and is derived from the photoelectric signals produced by filter elements $Y_E+M_G$, $C_Y+G$, $Y_E+M_G$, $C_Y+G$, etc. FIG. 6 represents the image pickup signal produced when an odd line is scanned and is derived from the photoelectric signals produced by filter elements $Y_E+G$, $C_Y+M_G$, $Y_E+G$, $C_Y+M_G$, etc. For convenience, FIGS. 5 and 6 also illustrate a saturation voltage level $E_{SAT}$, which represents the level of the image pickup signal whereat signal processing circuitry to which the image pickup signal is supplied operates in saturation. It is appreciated that, for proper signal processing, the level of the image pickup signals should be less than this saturation voltage level $E_{SAT}$. Although the modulation swings of the image pickup signals produced during the even and odd line scans differ (in the example illustrated, the modulation component produced during even line scans in greater than the modulation component produced during odd line scans), it is assumed that the signal level of the even and odd scan lines does not exceed the saturation voltage level $E_{SAT}$ and, therefore, the average value of these image pickup signals is substantially equal.

If the brightness of the object being imaged increases, the modulation swings of the image pickup signals likewise increase, as illustrated in FIGS. 7 and 8. Consistent with FIGS. 5 and 6, FIG. 7 represents the image pickup signal produced when an even line is scanned and FIG. 8 represents the image pickup signal produced when an odd line is scanned. In the example being described, the brightness of the object being imaged is such that the level of the image pickup signals produced during an even scan line exceeds the saturation voltage level $E_{SAT}$. If the maximum level of the image pickup signal produced during an odd scan line remains less than this saturation voltage level, then the level of the average value $E_{AVL}$ of the image pickup signals produced during an even scan line will be less than the level of the average value $E_{AVL}$ of the image pickup signal produced during an odd scan line. The fact that these average values differ from each other deleteriously influences a contour correction operation that normally is carried out on the image pickup signals derived from the video camera.

Contour correction in the vertical direction typically is performed by extracting components of adjacent lines of the luminance signal which are not correlated with each other. Such uncorrelated components typically are present at a contour; and these extracted components are emphasized and used to provide contour correction of the luminance signal. From the preceding discussion, it is recognized that the luminance signal is related to the average value of the image pickup signals derived from the complementary color matrix filter. Thus, if the levels of the average values of the image pickup signals produced during the even and odd scan lines differ, such as shown in FIGS. 7 and 8, the uncorrelated components in successive lines of the luminance signal will be much larger than they should be. In contour correction, the extracted, uncorrelated components are superimposed on the luminance signal. Hence, when the difference in the levels of the average value $E_{AVL}$ of the image pickup signals produced during even and odd scan lines is large, erroneous contour correction is performed, resulting in degraded quality of the resultant video picture.

It has been proposed, such as in Japanese Laid-Open Patent Application No. 269873/88, to eliminate this difficulty by suspending the contour correction operation if the video signal processing circuits are saturated. However, this requires a rather intricate detecting circuit and adds to the overall complexity of the video signal processing circuitry. Furthermore, if contour correction is suspended when saturation is detected, that is, when the brightness of the object being imaged is relatively high, an abrupt change in picture quality may be observed. FIG. 9 is a graphical representation of an abrupt suspension in the contour correcting operation when the brightness of the scene being imaged exceeds a value which would result in saturation of the signal processing circuitry.

OBJECTS AND SUMMARY OF THE INVENTION

Therefore, it is an object of the present invention to provide improved video signal processing apparatus for use with a video camera which provides a good black reference level in the horizontal flyback period of the video signal.

Another object of this invention is to provide means for inserting replacement black signal information into a portion of the flyback period of a video signal, which replacement information is a function of the optical black signal level normally provided in that flyback period.

A further object of this invention is to provide video signal processing apparatus for use with a video camera to produce a video signal with an optical black signal level during one portion of the horizontal flyback period and with replacement black signal information that is a function of that optical black signal level during another portion of the flyback period.

An additional object of this invention is to provide improved contour correction of a video signal derived from an image pickup element having an optical complementary color matrix filter.

Yet another object of this invention is to provide video signal processing apparatus for use with an image pickup device of the type having an optical complementary color matrix filter, wherein image signals derived from that pickup device are prevented from reaching levels which would saturate signal processing circuitry and which otherwise would introduce errors into a contour correction operation.

Various other objects, advantages and features of the present invention will become readily apparent from the ensuing detailed description, and the novel features will be particularly pointed out in the appended claims.

In accordance with one aspect of this invention, video signal processing apparatus is provided for use with a video camera having line scanning and flyback periods, wherein useful video information is produced during a line scanning period and an optical black signal level is produced during at least a portion of the flyback period. During another portion of the flyback period, replacement circuitry operates to insert replacement black signal information that is a function of the optical black signal level. Preferably, the video camera includes a pickup device having an image pickup surface and an optical black surface, the latter being scanned during the flyback period to produce the optical black signal level.

In accordance with another aspect of this invention, video signal processing apparatus is provided for use with an image pickup element having an optical complementary color matrix filter provided with successive rows of patterns of color filter elements such that the patterns of adjacent rows of filter elements from which an even scan line of image pickup signals is derived differ from the patterns of adjacent rows of filter elements from which an odd scan line of image pickup signals is derived. Modulation components in a scan line of image pickup signals caused by the patterns of filter elements are removed to produce an averaged scan line of image signals. A processing circuit extracts from the averaged image signals a signal component that is uncorrelated from one averaged scan line to the next, and a clipping circuit coupled to the processing circuit operates to clip that portion of an averaged scan line of image signals which exceeds a predetermined level that is less than the lowest average level of a scan line of image signals that would saturate the processing circuit. The extracted uncorrelated signal component is combined with an averaged scan line of image signals to produce a contour emphasized luminance signal.

BRIEF DESCRIPTION OF THE DRAWINGS

The following detailed description, given by way of example and not intended to limit the present invention solely thereto, will best be understood in conjunction with the accompanying drawings in which:

FIG. 4 is a schematic representation of a portion of an optical complementary color matrix filter which produces difficulties that are remedied by another aspect of the present invention;

FIGS. 5, 6, 7 and 8 are waveform diagrams which are useful in understanding the problem which is overcome by this aspect of the present invention;

FIG. 9 is a graphical representation of a difficulty associated with a prior art proposal to relieve the problems solved by the present invention;

DETAILED DESCRIPTION OF CERTAIN PREFERRED EMBODIMENTS

Figure 1:
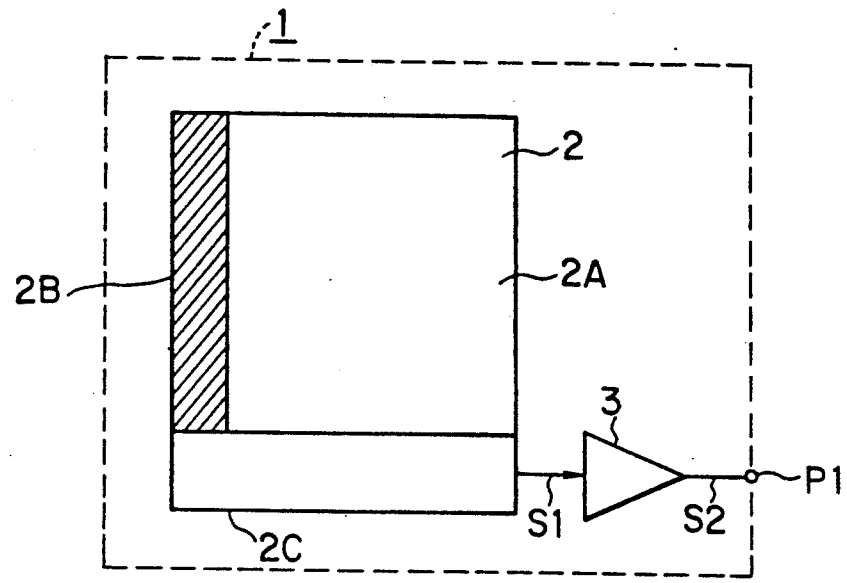
FIG. 1 is a schematic representation of an image pickup device with which one aspect of the present invention finds ready application.
Figure 2:
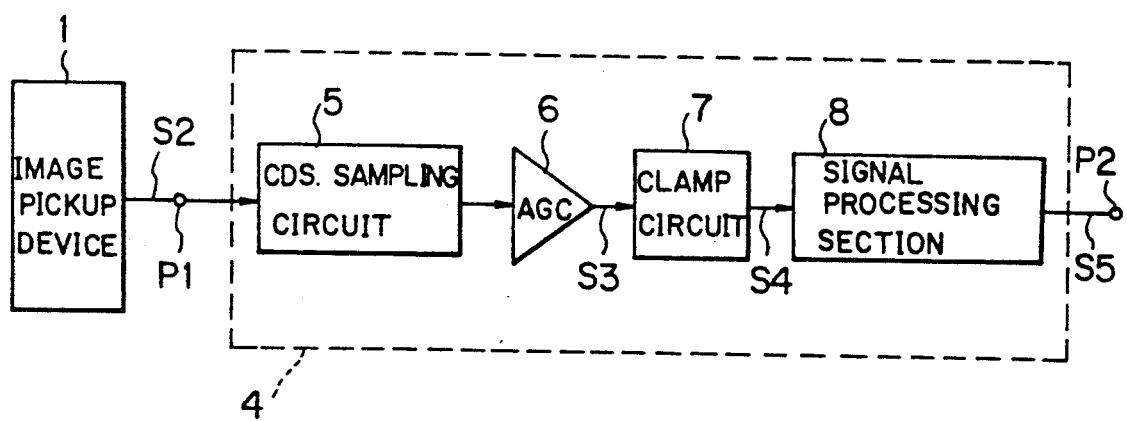
FIG. 2 is a block diagram of prior art signal processing circuitry used with the image pickup device shown in FIG. 1.
Figure 10:
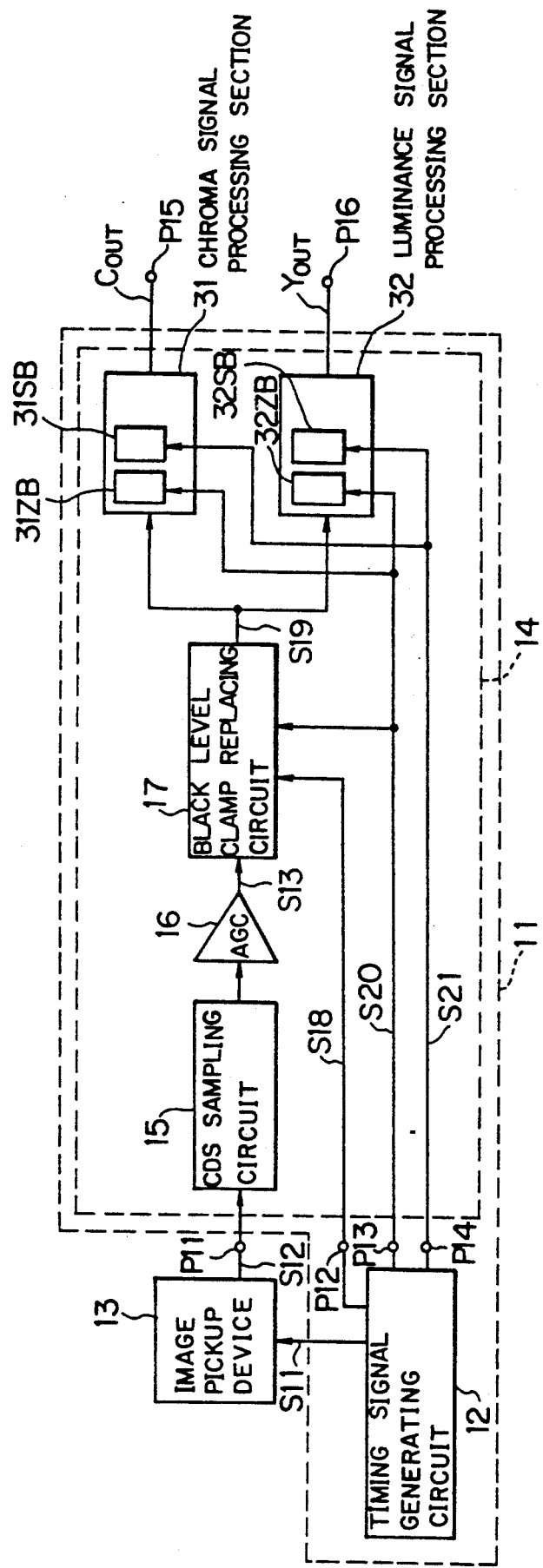
FIG. 10 is a block diagram of video signal processing circuitry which includes one aspect of the present invention.
Figure 11:
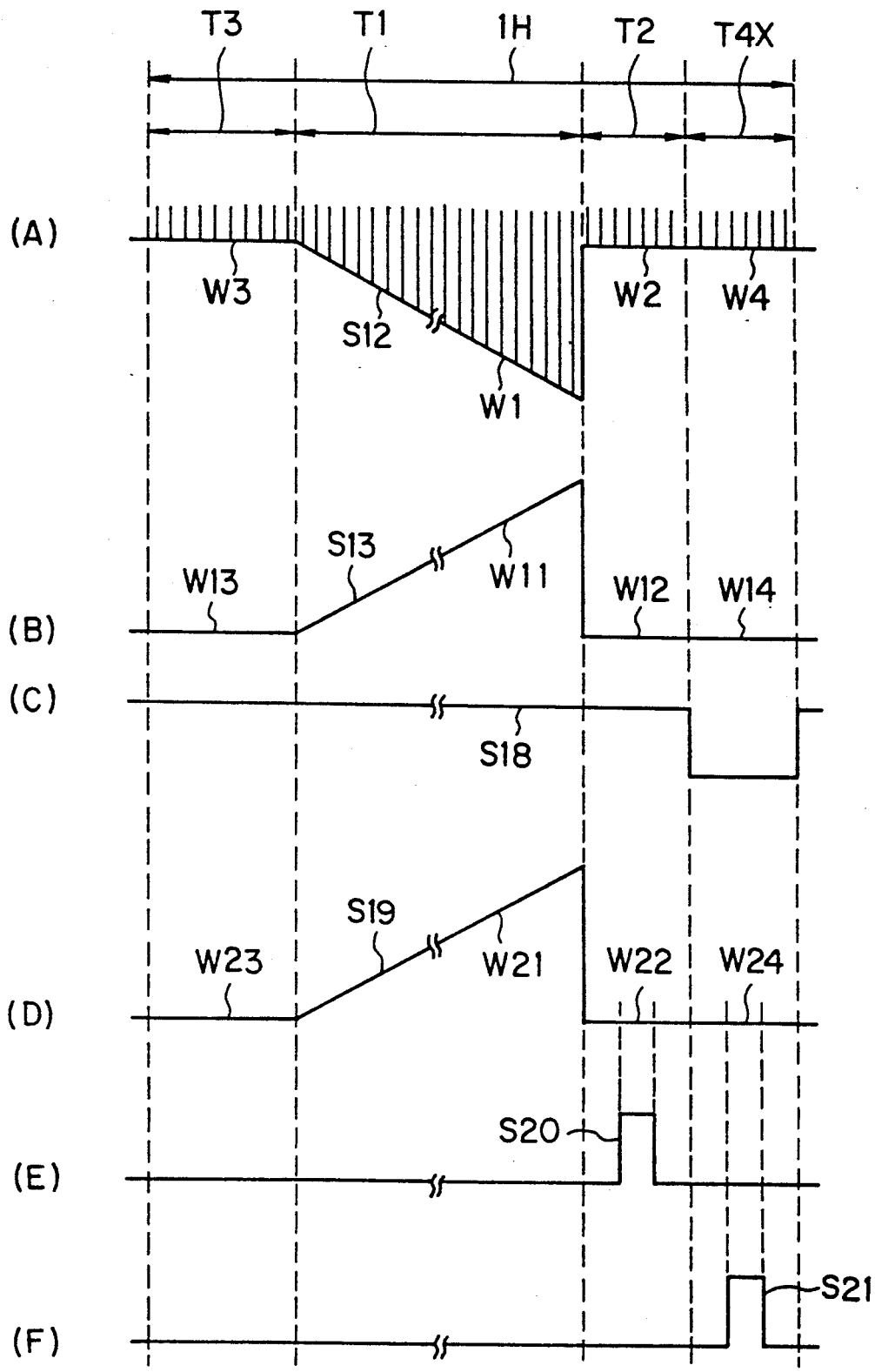
FIGS. 11A-11F are waveform diagrams which are useful in understanding the operation of the invention shown in FIG. 10.

Video signal processing circuitry is illustrated in FIG. 10 which includes one aspect of the present invention. This circuitry 11 is used with an image pickup device 13 which, for example, may be a solid-state element such as a CCD device supplied with suitable timing signals $S_3$ from a timing signal generator 12 for producing line-by-line image pickup signals $S_{12}$. An illustrative waveform of one line of image pickup signal $S_{12}$ is shown in FIG. 11A. This image pickup signal is supplied from an output terminal $P_{11}$ of image pickup device 13 to a CDS sampling circuit 15 included in image signal processing circuit 14. Similar to the prior art embodiment shown in FIG. 2, the sampled image pickup signal produced by the CDS sampling circuit is subjected to automatic gain control by an AGC circuit 16 to produce an image signal $S_{13}$ having the waveform shown in FIG. 11B. It will be appreciated that image signal $S_{13}$ is comprised of useful video information $W_{11}$ during a line scanning period $T_1$ and a black reference signal level $W_{12}$ during portion $T_2$ of the horizontal flyback period. Although not shown in FIG. 10, the black reference signal level preferably is derived from an optical black surface included in image pickup device 13 and is referred to as an optical black signal level. Thus, the image pickup device shown in FIG. 10 may be similar to image pickup device 1 of FIG. 1.

Figure 3:
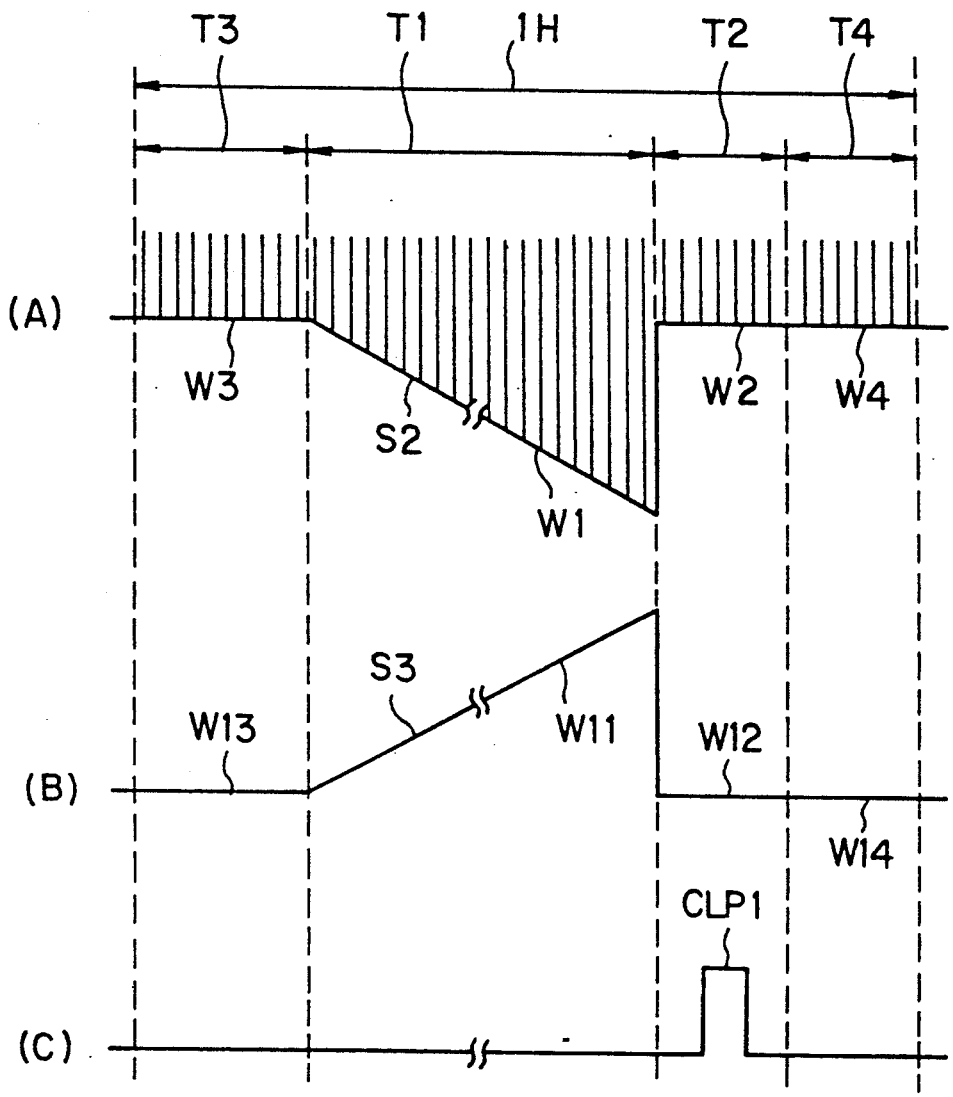
FIGS. 3A-3C are waveform diagrams which are useful in understanding the operation of the circuitry shown in FIG. 2.

Like image signal $S_3$ shown in FIG. 3, image signal $S_{13}$ produced by AGC circuit 16 also includes a blank signal $W_{14}$ during portion $T_{4X}$ of the flyback period, as well as a blank signal $W_{13}$ during that portion $T_3$ of the flyback period which immediately precedes scanning period $T_1$. Image signal $S_{13}$ having the general waveform schematically illustrated in FIG. 11B is supplied to a black level clamp replacing circuit 17 which functions to replace blank signal $W_{14}$ with replacement black signal information that is a function of the optical black signal level $W_{12}$, as will be described below in conjunction with FIG. 12. The black level clamp replacing circuit produces an output video signal $S_{19}$ that is coupled to video signal processing sections illustrated as a chrominance signal processing section 31 and a luminance signal processing section 32. As will be described below, each of these signal processing sections includes plural stages, each of which clamps the output video signal supplied thereto so as to use the clamped black level therein as a reference from which signal processing operations are performed.

Advantageously, different stages in each signal processing section are supplied with different timing signals from timing signal generator 12 so as to clamp the output video signal at different portions of the flyback period. Consequently, one stage in the signal processing section clamps the output video signal at the optical black signal level present at the output of black level clamp replacing circuit 17, and another stage in the signal processing section clamps the output video signal at the replacement black signal information level which is inserted into portion $T_{4X}$ of the flyback period by black level clamp replacing circuit 17, as will now be described. It will be appreciated that, if the optical black signal level and the replacement black signal information level are equal, or otherwise related to each other, errors which may be attributed to a clamping operation when one black level is clamped will not be imparted to other signal processing stages which operate to clamp a different black level. Thus, errors due to noise or leakage of the clamping pulse, as mentioned above, are avoided.

Figure 12:
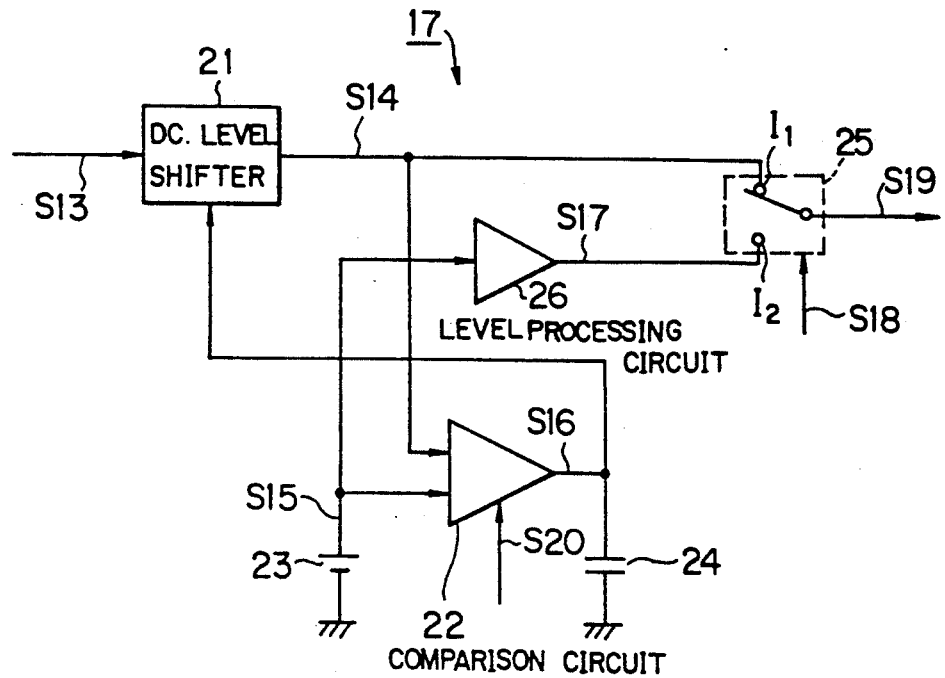
FIG. 12 is a block diagram showing one embodiment of the black level clamp replacing circuit shown in FIG. 10.

Black level clamp replacing circuit 17 is illustrated in FIG. 12 as comprising a DC level shifting circuit 21, a comparator 22, a level processing circuit 26 and a change-over switch 25. The DC level shifting circuit is supplied with image signal $S_{13}$ and is adapted to receive a DC control signal from comparator 22 which determines the DC level of the image signal. Hence, the DC level of the image signal is shifted upward or downward as a function of the comparator. This level-shifted image signal $S_{14}$ is supplied to one input terminal $I_1$ of change-over switch 25.

Comparator 22 is adapted to compare the DC level of the level-shifted image signal $S_{14}$ to a reference level $S_{15}$ produced by a reference voltage source 23. Preferably, the comparator is selectively enabled by an enable timing pulse $S_{20}$ produced by timing signal generator 12 during portion $T_2$ of the flyback period. When enabled, the output of comparator 22 is fed back to DC level shifting circuit 21 to adjust the DC level of the image signal supplied thereto. The DC control signal produced by the comparator also is stored on a capacitor 24 so as to supply a continuous DC level control signal to the DC level shifting circuit. It will be seen that the DC level of the image signal thus is controlled so as to be equal to the DC reference level $S_{15}$. Any difference therebetween is detected by comparator 22 at the enable timing pulse $S_{20}$ and is used to adjust the level-shifted image signal $S_{14}$ in a direction to make the DC level thereof equal to the DC reference level. Hence, undesired DC level changes which may be present in the image signal during a horizontal scanning interval are corrected.

Level processing circuit 26 is illustrated as an amplifier coupled to reference voltage source 23. The level processing circuit produces a replacement black signal level, also referred to herein as replacement black signal information, merely by amplifying the reference level $S_{15}$ by a suitable gain. Consequently, the reference level is subjected to a level adjustment by the level processing circuit to provide a black signal level substantially equal to the optical black signal level of the level-shifted image signal $S_{14}$. This black signal level $S_{17}$ is applied to terminal $I_2$ of change-over switch 25.

The change-over switch is coupled to timing signal generator 12 to receive therefrom a change-over timing signal $S_{18}$ which changes the connection of the output of switch 25 from terminal $I_1$ to terminal $I_2$. As will be described, switch 25 normally couples level-shifted image signal $S_{14}$ to its output but, in response to change-over timing signal $S_{18}$, the switch couples black signal level $S_{17}$ to its output. Thus, a portion of the level-shifted image signal which otherwise is present during the duration of change-over timing signal $S_{18}$ is replaced by the black signal level produced by level-processing circuit 26. Consequently, the black signal produced by the level-processing circuit is referred to herein as the replacement black signal level. Change-over switch 25 produces an output video signal $S_{19}$ constituted by the level-shifted image signal $S_{14}$ and the replacement black signal level $S_{17}$.

Image signal $S_{13}$ supplied to black level clamp replacing circuit 17 is illustrated in FIG. 11B. The image signal includes optical black signal level $W_{12}$, and it is this optical black signal level that is compared to the reference level $S_{15}$ by comparator 22. Any differences therebetween are fed back to adjust the DC level of the image signal, resulting in level-shifted image signal $S_{14}$. This level-shifted image signal is supplied through change-over switch 25 during line scanning period $T_1$ and portion $T_2$ of the flyback period. FIG. 11D illustrates the output video signal $S_{19}$ derived from level-shifted image signal $S_{14}$ during periods $T_1$, $T_2$ and $T_3$.

Timing signal generator 12 produces a change-over timing signal $S_{18}$ having a duration equal to portion $T_{4X}$ of the flyback period. FIG. 11C illustrates this change-over timing signal $S_{18}$. In response to this change-over timing signal, switch 25 couples the replacement black signal level $S_{17}$ to the output thereof; and this replacement black signal level is illustrated as waveform $W_{24}$ in FIG. 11D. Thus, output video signal $S_{19}$ is formed of level-shifted image signal $S_{14}$, including useful video information $W_{21}$, the optical black signal level $W_{22}$ and the blank signal $W_{23}$ during portions $T_1$, $T_2$ and $T_3$, respectively, of the line scanning period. In response to change-over timing signal $S_{18}$, change-over switch 25 supplies the replacement black signal level $W_{24}$ during portion $T_{4X}$ of the flyback period. Nevertheless, this replacement black signal level $W_{24}$ is derived from reference level $S_{15}$ and is substantially equal to the optical black signal level $W_{22}$.

FIG. 11E illustrates the enabling timing pulse $S_{20}$. This pulse is timed to occur during portion $T_2$ of the flyback period so as to enable the comparator when the optical black signal level is present at the output of DC level shifting circuit 21. If, in response to enabling pulse $S_{20}$, comparator 22 detects a difference between the optical black signal level and the reference level $S_{15}$, the DC level of the image signal $S_{13}$ is shifted accordingly to making the compared levels equal. Thus, the level of the useful video information $W_{21}$ is shifted in a corresponding manner so as to be properly referenced to the optical black signal level. The level-shifted image signal $S_{14}$ maintains an optical black signal level determined by the reference level $S_{15}$.

The output video signal $S_{19}$ produced by black level clamp replacing circuit 17 is coupled to chrominance signal processing section 31 and to luminance signal processing section 32, as shown in FIG. 10. For simplification, each of these signal processing sections is comprised of plural stages, illustrated as two stages, supplied with clamping pulses $S_{20}$ (clamping pulse $S_{20}$ may be the same as enabling pulse $S_{20}$ of FIG. 11E) and $S_{21}$, respectively, produced by timing signal generator 12. Accordingly, chrominance signal processing section 31 is shown with processing stage $31_{ZB}$ and processing stage $31_{SB}$ supplied with clamping pulses $S_{20}$ and $S_{21}$, respectively. Similarly, luminance signal processing section 32 is illustrated with stages $32_{ZB}$ and $32_{SB}$ supplied with clamping pulses $S_{20}$ and $S_{21}$, respectively. The structure and operation of each stage form no part of the present invention per se; but it will be appreciated that the successful operation of each stage is dependent, at least in part, on the black reference level present in the output video signal $S_{19}$.

Clamping pulses $S_{20}$ and $S_{21}$ are illustrated in FIGS. 11E and 11F. It is seen that clamping pulse $S_{20}$ serves to clamp the optical black signal level $W_{22}$ included in output video signal $S_{19}$; and clamping pulse $S_{21}$ serves to clamp the replacement black signal level $W_{24}$ included in the output video signal. Hence, the black level clamped in, for example, stage $32_{ZB}$ may differ from the black level clamped in stage $32_{SB}$. If these two black levels are substantially equal, as is produced by black level clamp replacing circuit 17 (and as is shown in FIG. 11D), both stages have the same black signal level as a reference. But, noise which may be superimposed on optical black signal level $W_{22}$ will not be present on replacement black signal level $W_{24}$. Similarly, leakage voltage which may be added to the optical black signal level $W_{22}$ by clamping pulse $S_{20}$ will not be added to the replacement black signal level $W_{24}$.

Clamping pulse $S_{20}$ is used by stage $31_{ZB}$ to clamp the optical black signal level $W_{22}$ included in the output video signal $S_{19}$; and clamping pulse $S_{21}$ is used by stage $31_{SB}$ to clamp the replacement black signal level $W_{24}$ included in the output video signal. Hence, stages $31_{ZB}$ and $32_{ZB}$ clamp the optical black signal level $W_{22}$ and, thereafter, stages $31_{SB}$ and $32_{SB}$ clamp the replacement black signal information $W_{24}$. For example, the optical black signal level $W_{22}$ may represent an absolute black level which stages $31_{ZB}$ and $32_{ZB}$ need to carry out their respective signal processing. Replacement black signal level $W_{24}$ may represent a black level which stages $31_{SB}$ and $32_{SB}$ need to control the dynamic range of the useful video information included in the output video signal. With the video signal processing circuitry shown in FIG. 10, the clamping operation which requires the absolute black level (as carried out by stages $31_{ZB}$ and $32_{ZB}$) is suspended when the clamping operation which utilizes the black level needed for dynamic range adjustment (as carried out by stages $31_{SB}$ and $32_{SB}$) is performed.

Figure 13:
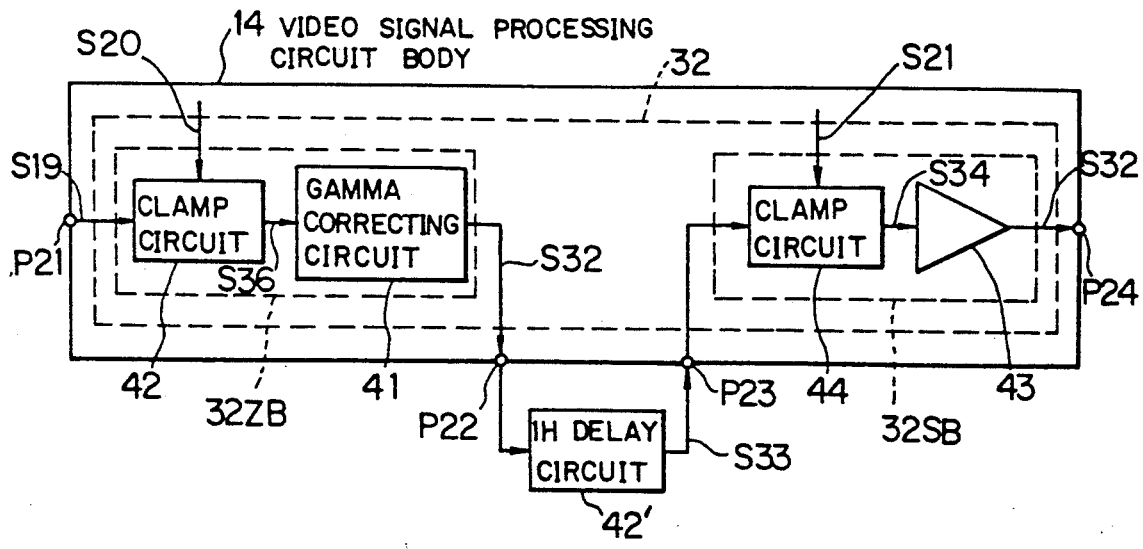
FIG. 13 is a block diagram of one embodiment of a portion of the luminance signal processing section shown in FIG. 10.

One example of stages $32_{ZB}$ and $32_{SB}$ that may be included in luminance signal processing section 32 is illustrated in FIG. 13. Although these stages are described as being included in the luminance signal processing section, the same or similar stages may be included in the chrominance signal processing section.

As shown, section $32_{ZB}$ may include a gamma correcting circuit 41 adapted to carry out gamma correction on video output signal $S_{19}$ supplied thereto. Section $32_{SB}$ is comprised of, for example, a gain control circuit 43 which functions to adjust the gain of the gamma-corrected output video signal supplied to the gain control circuit by way of a 1 H delay circuit 42'. As an alternative, stage $32_{ZB}$ (or stage $31_{ZB}$) may include a luminance signal set-up stage or a chrominance signal carrier balance stage. Stage $32_{SB}$ (or stage $31_{SB}$) may include the illustrated 1 H delay gain adjusting stage, an aperture control stage or a horizontal synchronizing signal stage. In the illustrated example, gamma correcting circuit 41 is supplied with a black level reference signal $S_{36}$ produced by a clamp circuit 42 which clamps the output video signal $S_{19}$ in response to clamping circuit $S_{20}$ (shown in FIG. 11E). Hence, the gamma correcting circuit is supplied with the optical black signal level $W_{22}$ which is obtained by the clamp pulse $S_{20}$. Similarly, gain control circuit 43 is supplied with a black level reference signal produced by clamp circuit 44 in response to clamping pulse $S_{21}$ (shown in FIG. 11F) which clamps the 1 H delayed gamma-corrected output video signal. Gain control circuit 43 thus is supplied with a black reference level $S_{34}$ which is produced by clamping the replacement black signal level $W_{24}$ (FIG. 11D) in response to the clamping pulse $S_{21}$ (FIG. 11F). Hence, gain control circuit 43 responds to the replacement black signal level to establish the proper dynamic range for the useful video information $W_{21}$ of the video signal.

By using the replacement black signal level $W_{24}$ as the reference signal for gain control circuit 43, the possibility of noise signals that may be superimposed onto the optical black signal level $W_{22}$, or of distortion in the reference signal due to leakage of clamping pulse $S_{20}$ is avoided. Since different clamping pulses are used to clamp different reference black levels $W_{22}$ and $W_{24}$ in the horizontal flyback period, any leakage or noise which may be present in the replacement black signal level $W_{24}$ does not adversely affect the reference level which is derived from the optical black signal level $W_{22}$. Hence, processing operations which rely upon an absolute black level, as will be obtained from the optical black signal level $W_{22}$, are performed accurately and without interference from distortions that may be introduced to the replacement black signal level $W_{24}$. Similarly, operations in which the dynamic range of the video signal is controlled by the replacement black signal level $W_{24}$ are performed accurately and without interference that otherwise may be introduced by distortions in the optical black signal level $W_{22}$.

Figure 14:
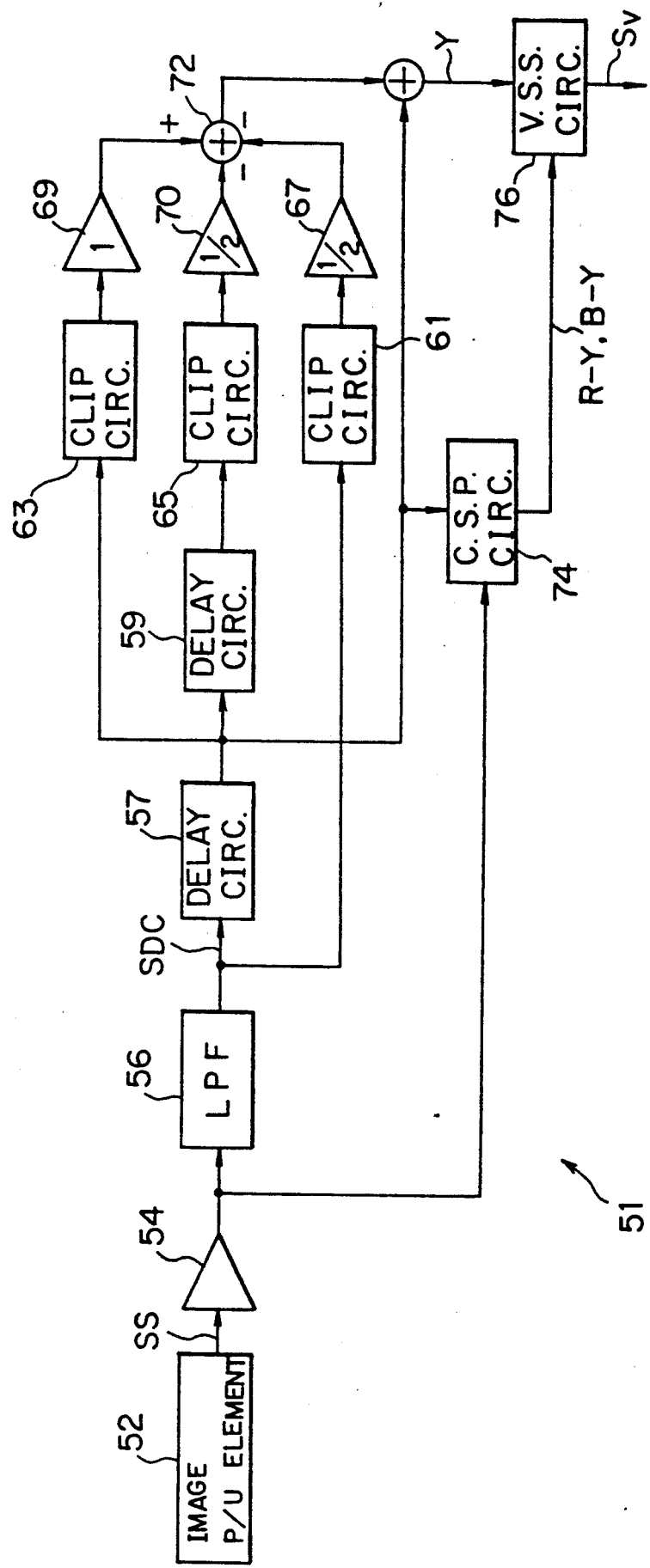
FIG. 14 is a block diagram of one embodiment of another aspect of the present invention.

Turning now to FIG. 14, there is illustrated a block diagram of a contour correcting circuit that may be used for contour correction of the video signal derived from an image pickup element 52 having an image projected thereto through an optical complementary color matrix filter of the type shown in FIG. 4. Image pickup element 52 is coupled to a low pass filter 56 by an amplifier 54. The filter serves to remove the modulation components in a scan line of image pickup signals caused by the patterns of filter elements included in the color matrix filter. Hence, the filter produces an averaged scan line of image signals. Thus, and with reference to FIGS. 5 and 6, the modulation components attributed to filter elements $Y_E+M_G$, $C_Y+G$, $Y_E+M_G$, $C_Y+G$, and the modulation components attributed to the filter elements $Y_E+G$, $C_Y+M_G$, $Y_E+G$, $C_Y+M_G$, etc., are filtered, resulting in the average levels $E_{AVL}$.

Contour correction is obtained by deriving a component from a scan line of image signals that is not correlated with image signals picked up from adjacent scan lines. Accordingly, the averaged image signal produced by low pass filter 56 is subjected to a delay equal to one scan line interval by a 1 H delay circuit 57; and this delayed, averaged scan line of image signals is subjected to another 1 H delay by delay circuit 59. If the image signals produced at the output of delay circuit 57 are considered to be the image signals produced during scan line n, then the image signals produced at the output of delay circuit 59 are those which are obtained during scan line n−1 and the image signals produced at the output of low pass filter 56 are those which are produced at scan line n+1. The image signals from line n are coupled to one input of a subtracting circuit 72 by way of a weighting circuit 69 which, for example, may be an amplifier. The image signals produced during scan line n−1 which appear at the output of delay circuit 59, are coupled to another input of subtracting circuit 72 by way of a weighting circuit 70 and are adapted to be subtracted from the image signals of line n. Likewise, the image signals produced during scan line n+1 are supplied from the output of low pass filter 56 to a further input of subtracting circuit 72 by way of weighting circuit 67 so as to be subtracted from the image signals produced during line n. Preferably, weighting circuits 67 and 70 may be amplifiers, each having a gain, or weighting function, that is one-half the gain, or weighting function of weighting circuit 69. Thus, for proper correlation, if the level of the image signals produced during lines n, n−1 and n+1 are all equal to E, then subtracting circuit 72 functions to carry out the following operation:

$$E - \tfrac{1}{2}E - \tfrac{1}{2}E$$

Differences that may be present from one line to the next appear as an uncorrelated component at the output of subtracting circuit 72. This uncorrelated signal component, which is derived from adjacent lines n, n+1 and n−1, is summed in an adding circuit 73 with the averaged image signals produced during line n and supplied from the output of delay circuit 57. The output of the adding circuit comprises a contour-emphasized luminance signal Y. This contour-emphasized luminance signal is supplied to a video signal synthesizing circuit 76 which also is coupled to a chrominance signal processing circuit 74, the latter receiving the averaged image signals produced during line n from delay circuit 57 as well as the image signal produced by image pickup element 52 and amplified by amplifier 54. The chrominance signal processing circuit is conventional and operates to produce color difference signals R-Y and B-Y. These color difference signals are combined with the contour-emphasized luminance signal in video signal synthesizing circuit 76 to produce a synthesized video signal $S_V$.

As pointed out previously in the discussion of the Background of the Invention, the inherent nature of the complementary color matrix filter is such that an increase in brightness of the scene being imaged may result in an increase in the modulation signal level produced when, for example, an even line is scanned, sufficient to saturate amplifiers 67, 69 or 70. As illustrated in FIGS. 7 and 8, saturation of an amplifier in response to the image signals produced when an even line is scanned but not when an odd line is scanned may cause subtracting circuit 72 to produce an erroneous output. This output is interpreted as an extracted uncorrelated signal component and serves to emphasize the luminance signal improperly. Thus, even though contour correction may not be needed, the saturation of one or more amplifiers results in an inaccurate contour-emphasized luminance signal. Rather than suspend the contour correction operation in response to such an increase in the brightness level of the scene being imaged, as proposed heretofore, the present invention connects clipping circuits 61, 63 and 65 to the inputs of weighting circuits 67, 69 and 70 to clip the averaged image signals supplied to the weighting circuits if those averaged image signals exceed a predetermined amount, thereby preventing the weighting circuits from being saturated.

Figure 15:
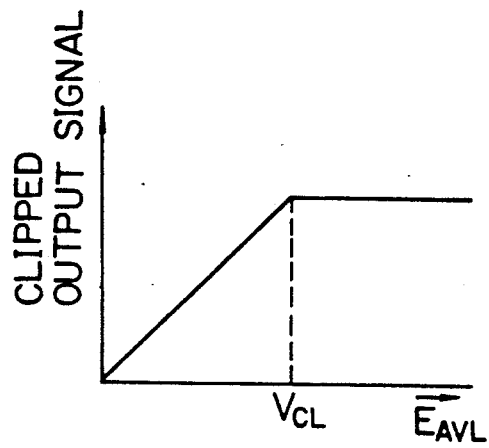
FIGS. 15, 16 and 17 are graphical illustrations which are useful in understanding the operation and advantages achieved by the embodiment shown in FIG. 14.
Figure 16:
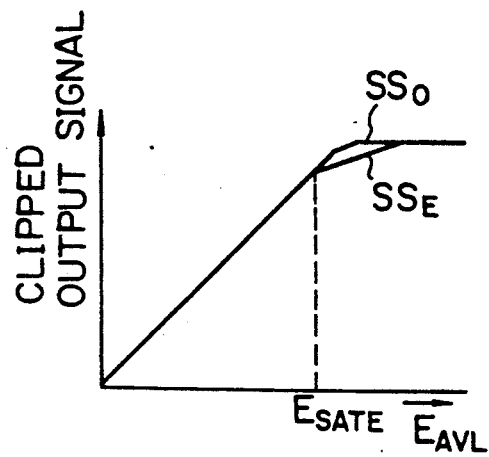
Figure 17:
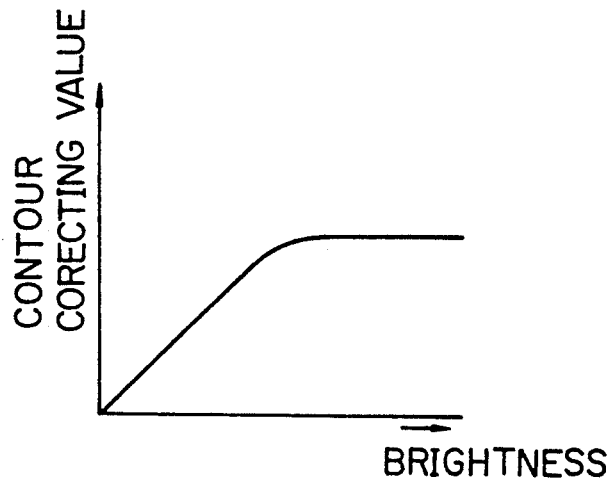

The advantages attained by incorporating clipping circuits 61, 63 and 65 may best be appreciated by referring to FIGS. 15, 16 and 17. FIG. 15 is a graphical representation of the relationship between the level of the averaged image signals $E_{AVL}$ and the clipped output signal produced by clipping circuit 61, 63 or 65. The clipping level of each of these clipping circuits is represented as $V_{CL}$; and it is seen that the output of the clipping circuit increases linearly with the level of the averaged image signal (i.e. the signal is not clipped) until the level of the averaged image signal exceeds the clipping level $V_{CL}$. Thereafter, the clipping circuit output remains constant.

FIG. 16 likewise is a graphical representation of the relationship between the level of the averaged image signal $E_{AVL}$ and the clipped output signal produced by clipping circuit 61, 63 or 65. FIG. 16 also indicates the average level $E_{SATE}$ of the image signal which contains modulation components of a magnitude sufficient to saturate amplifiers 67, 69 or 70, such as may be produced during an even scan line. It is assumed in FIG. 16 that the average level of the image signals produced during an even scan line for a brightness which results in saturation of the amplifiers is less than the averaged level of the image signals produced during an odd scan line. If the image signal produced by image pickup element 52 during an even scan line is represented as $SS_E$ and the image signal produced by the image pickup element during an odd scan line is represented as $SS_O$, then it is seen in FIG. 16 that the averaged level of the image pickup signal $SS_E$ which results in amplifier saturation is lower than the averaged level of the image pickup signal $SS_O$ which does not cause saturation. The clipping level $V_{CL}$ of the clipping circuits is set to be less than the lowest average level of an even or odd scan line of image signals which would result in saturation of the amplifiers. Accordingly, in the present example wherein it is assumed that the modulation components of an even line of image signals will result in saturation but the modulation components of an odd line of image signals will not, and wherein it is further assumed that the average level of the even line of image signals for that occurrence is $E_{SATE}$, then $V_{CL} < E_{SATE}$. Hence, the averaged image signals are clipped before the average level thereof reaches the saturation level $E_{SATE}$.

From FIG. 17, it is seen that, as the brightness of the imaged object increases, contour correction likewise increases in a linear manner. However, when the brightness reaches a level such that the averaged image signal produced in response thereto exceeds the clipping level $V_{CL}$, contour correction approaches a constant value which no longer changes with an increase in brightness. This is compared with the prior art relationship between brightness and contour correction shown in FIG. 9, whereby contour correction is suspended when the brightness of the object being imaged exceeds a threshold level. In accordance with the present invention, contour correction is not suspended but, rather, remains constant. Thus, vertical contour correction is achieved even if the brightness of the object being imaged is quite high.

Although a change in brightness may result in different average levels of the image signals produced during even and odd scan lines, such as shown in FIGS. 7 and 8, if the averaged image signals are clipped at higher brightness levels, the average levels tend to be substantially equal to each other. Hence, difficulties caused by differences in the average levels of the image signals produced during even and odd scan lines are avoided.

Figure 18:
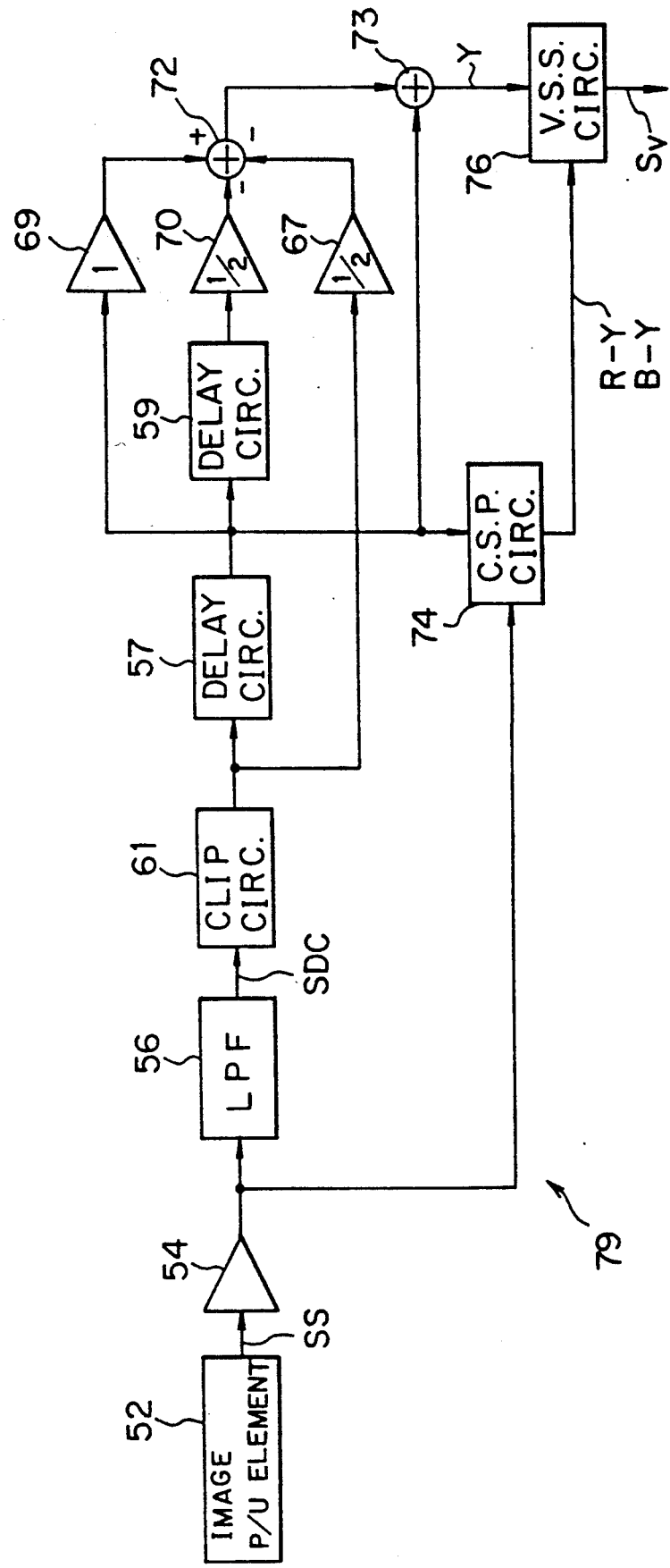
FIG. 18 is a block diagram of another embodiment of the invention shown in FIG. 14.

Another embodiment of the contour correcting apparatus shown in FIG. 14 is illustrated in FIG. 18, wherein like reference numerals are used to identify like elements. It will be appreciated that the embodiment shown in FIG. 18 differs from that shown in FIG. 14 in that the individual clamping circuits 61, 63 and 65 through which the respective scan lines of averaged image signals are supplied to weighting circuits 67, 69 and 70 in FIG. 14 are replaced by a single clipping circuit 61 connected directly to the output of low pass filter 56 in FIG. 18. Nevertheless, in the FIG. 18 embodiment, clipped, averaged image signals from scan line n are supplied to weighting circuit 69, clipped averaged image signals from scan line n−1 are supplied to weighting circuit 70 and clipped averaged image signals from scan line n+1 are supplied to weighting circuit 67. Hence, the embodiment shown in FIG. 18 operates in substantially the same way as the aforedescribed embodiment shown in FIG. 14. It will be appreciated that, functionally, there is no substantial difference between clipping the averaged image signals before or after they are delayed by delay circuits 57 and 59.

Figure 19:
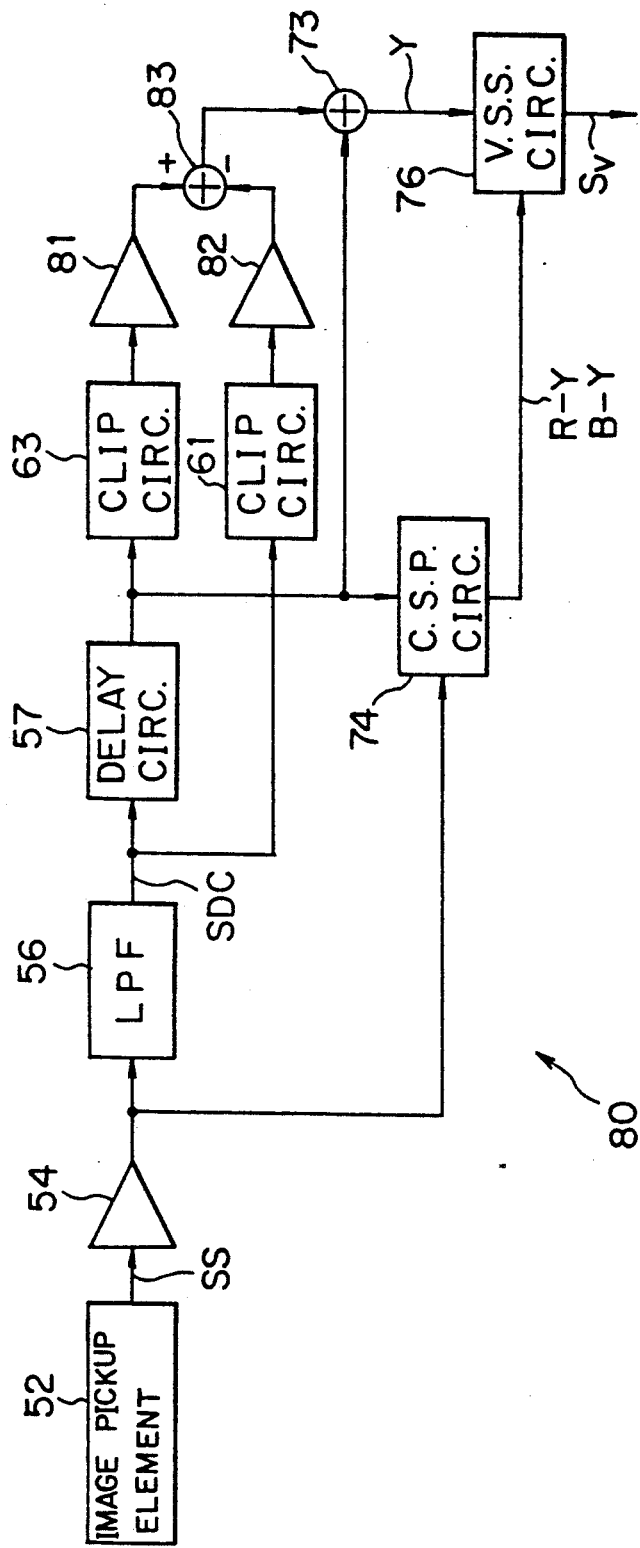
FIG. 19 is a block diagram of yet another embodiment of the invention shown in FIG. 14.

Yet another embodiment of contour correcting apparatus is illustrated in FIG. 19. The embodiment shown in FIG. 19 is similar to that discussed above in conjunction with FIG. 14 and like reference numerals are used to identify like elements. Whereas in the embodiment of FIG. 14, differences between the averaged image signals in scan line n and the averaged image signals in adjacent scan lines n+1 and n−1 are extracted, the embodiment of FIG. 19 extracts differences in the averaged image signals between scan lines n and n+1. Accordingly, only one 1 H delay circuit 57 is provided; and this delay circuit supplies the averaged image signals in scan line n to one input of a subtracting circuit 83 from which the averaged image signals in scan line n+1 are subtracted. It is seen that weighting circuits 81 and 82 supply the averaged image signals of scan lines n and n+1, respectively, to the subtracting circuit. These weighting circuits impart equal weight to the image signals supplied thereby and, in one embodiment, the weighting circuits comprise amplifiers having substantially equal gains.

Nevertheless, to prevent the average level of the averaged image signals supplied to subtracting circuit 83 from exceeding the saturation voltage of amplifiers 81 and 82, clipping circuits 61 and 63 prevent the averaged image signals from reaching the saturation voltage. Of course, subtracting circuit 83 extracts a signal component that is not correlated from scan line n to scan line n+1; and this extracted uncorrelated component is added to the averaged image signal of scan line n to produce the contour-emphasized luminance signal Y. Vertical contour correction of the video signal thus is obtained.

While the present invention has been particularly shown and described with reference to preferred embodiments, it will be readily appreciated by those of ordinary skill in the art that various changes and modifications may be made without departing from the spirit and scope of the invention. For example, the image pickup element that may be used in each embodiment can be implemented as a CCD element or other conventional solid-state pickup devices. Alternatively, the image pickup device may comprise a conventional cathode ray tube. Furthermore, in the embodiment of FIG. 10, the replacement black signal level $W_{24}$ (described in conjunction with FIG. 11D) need not be equal exactly to the optical black signal level $W_{22}$. Rather, depending upon the reference level which is used by the individual processing circuits that clamp this replacement black signal level, the replacement black signal level may be shifted to be greater or less than the optical black signal level by a desired amount. Still further, in the contour correction apparatus shown in FIGS. 14, 18 and 19, the delays imparted to the averaged image signal by delay circuits 57 and 59 need not be limited solely to a 1 H delay. Rather, the delay imparted to the image signal may be equal to two or more horizontal scanning periods.

It is intended that the appended claims be interpreted as including the embodiments described herein, the alternatives mentioned above and all equivalents thereto.

What is claimed is:

1. Video signal processing apparatus for use with video imaging means having a line scanning period and a flyback period, comprising image signal means for producing an image signal having useful video information during said line scanning period and an optical black signal level during at least one portion of said flyback period; optical black level processing means including reference level means and means responsive to said reference level means for adjusting said optical black signal level to reduce level changes therein; replacement means for inserting during another portion of said flyback period a replacement black signal level that is a function of said reference level means; and clamping means including means for generating first and second clamping pulses and first and second clamp circuits responsive to said first and second clamping pulses for clamping the adjusted optical black signal level and the replacement black signal level, respectively, and gamma correcting means connected in circuit between said first and second clamp circuits for gamma correcting the image signal that is clamped to the adjusted black signal level.

2. The apparatus of claim 1 wherein said reference level means includes a reference source for providing a reference signal, and said means for adjusting includes comparator means for providing a comparison of said optical black signal level to said reference signal, and DC level shifting means for adjusting said optical black signal level as a function of said comparison.

3. The apparatus of claim 2 wherein said replacement mans includes means for deriving said replacement black signal level from said reference signal; and switch means for normally selecting said useful video information and the adjusted optical black signal level and for selecting said replacement black signal level during said other portion of said flyback period.

4. The apparatus of claim 3 wherein said replacement means further includes timing signal generating means for supplying a change-over timing signal to said switch means having a duration equal to said other portion of said flyback period to cause said switch means to select said replacement black signal level.

5. The apparatus of claim 4 wherein said timing signal generating means generates said first and second clamping pulses, said first clamping pulse occurring during said one portion of said flyback period for enabling said comparator means.

6. The apparatus of claim 4 wherein said means for deriving said replacement black signal level comprises level processing means for processing said reference signal to a level substantially equal to said optical black signal level.

7. The apparatus of claim 1 wherein said video imaging means includes pickup means having an image pickup surface and an optical black surface, and means for scanning said image pickup surface during said line scanning period and for scanning said optical black surface during said flyback period to produce an image pickup signal, and wherein said image signal means comprises sampling means for sampling said image pickup signal and automatic gain control means coupled to said sampling means to provide said useful video information and said optical black signal level.

8. Video signal processing apparatus for processing a video signal having a line scanning period during which useful video information is present and a flyback period during a first portion of which an optical black signal level is present, said apparatus comprising: black level replacement means for replacing the video signal which is present during a second portion of the flyback period with a replacement black signal level; timing signal generating means for generating a first timing pulse during said first portion of said flyback period, a second timing pulse for activating said black level replacement means and a third timing pulse during said second portion of said flyback period; chrominance signal processing means coupled to said black level replacement means for receiving the video signal therefrom and including first and second chrominance processing stages operable to clamp the black signal level of said video signal supplied thereto; luminance signal processing means coupled to said black level replacement means for receiving the video signal therefrom and including first and second luminance processing stages operable to clamp the black signal level of said video signal supplied thereto; means for supplying said first timing pulse to the first chrominance processing stage and to the first luminance processing stage to clamp the optical black signal level in the video signal; and means for supplying said third timing pulse to the second chrominance processing stage and to the second luminance processing stage to clamp the replacement black signal level in the video signal.

9. The apparatus of claim 8 wherein said black level replacement means includes a reference source for providing a reference signal, comparator means responsive to said first timing pulse for providing a comparison of said optical black signal level to said reference signal, and adjustment means coupled to said comparator means for adjusting said optical black signal level as a function of said comparison.

10. The apparatus of claim 9 wherein said black level replacement means further includes means for deriving said replacement black signal level from said reference signal; and switch means for normally selecting said useful video information and the adjusted optical black signal level and responsive to said second timing pulse for selecting said replacement black signal level during said second portion of said flyback period.

11. The apparatus of claim 10 wherein said adjustment means comprises DC level shifting means for receiving said useful video information and said optical black signal level and responsive to the comparison provided by said comparator means for shifting the DC level of said useful video information and optical black signal level.

12. The apparatus of claim 10 wherein said means for deriving said replacement black signal level comprises level processing means for processing said reference signal to a level substantially equal to said optical black signal level.

* * * * *